United States Patent
Kochhan et al.

(10) Patent No.: US 10,040,343 B2
(45) Date of Patent: Aug. 7, 2018

(54) HYDRAULIC HYBRID

(71) Applicant: Deutz Aktiengesellschaft, Cologne (DE)

(72) Inventors: Ralf Kochhan, Lohmar (DE); Taghi Akbarian, Cologne (DE)

(73) Assignee: DEUTZ AKTIENGESELLSCHAFT, Cologne (DE)

( * ) Notice: Subject to any disclaimer, the term of this patent is extended or adjusted under 35 U.S.C. 154(b) by 682 days.

(21) Appl. No.: 14/396,785

(22) PCT Filed: Mar. 2, 2013

(86) PCT No.: PCT/EP2013/000626
§ 371 (c)(1),
(2) Date: Oct. 24, 2014

(87) PCT Pub. No.: WO2013/159851
PCT Pub. Date: Oct. 31, 2013

(65) Prior Publication Data
US 2015/0113969 A1    Apr. 30, 2015

(30) Foreign Application Priority Data

Apr. 26, 2012    (DE) .......................... 10 2012 008 192

(51) Int. Cl.
*B60K 6/12*    (2006.01)
*B60W 10/06*    (2006.01)
(Continued)

(52) U.S. Cl.
CPC .............. *B60K 6/12* (2013.01); *B60W 10/06* (2013.01); *B60W 10/103* (2013.01); *B60W 10/24* (2013.01); *B60W 10/30* (2013.01); *B60W 20/19* (2016.01); *F16H 61/4096* (2013.01); *B60K 2006/126* (2013.01); *B60Y 2200/41* (2013.01); *Y02T 10/6208* (2013.01)

(58) Field of Classification Search
CPC ................................. B60W 10/24; B60K 9/12
See application file for complete search history.

(56) References Cited

U.S. PATENT DOCUMENTS 6,009,708 A    1/2000    Miki et al.
6,466,883 B1 *  10/2002    Shim ....................... F15B 1/033
                                                    702/114

(Continued)

FOREIGN PATENT DOCUMENTS

DE    10 2006 046127    4/2008
DE       1020 9 824    5/2008
(Continued)

*Primary Examiner* — Michael Leslie
*Assistant Examiner* — Richard Drake
(74) *Attorney, Agent, or Firm* — Davidson, Davidson & Kappel, LLC

(57) ABSTRACT

A hybrid system, consisting of an internal combustion engine (1) with added-on and/or integrated hydraulic pumps (2) to supply consumers (5) and/or the drive unit (12), at least one engine control unit (3) for electronic engine regulation and/or fuel-injection regulation, at least one hydraulic control unit (4) to control at least one hydraulic consumer (5), at least one pressure sustaining valve (6), at least one reversing valve (7) and at least one hydraulic pressure accumulator (8).

14 Claims, 4 Drawing Sheets

(51) Int. Cl.
*B60W 10/24* (2006.01)
*F16H 61/4096* (2010.01)
*B60W 10/103* (2012.01)
*B60W 10/30* (2006.01)
*B60W 20/19* (2016.01)

(56) References Cited

U.S. PATENT DOCUMENTS

| | | | | |
|---|---|---|---|---|
| 6,619,762 | B2* | 9/2003 | Nitta | B60T 8/4036 |
| | | | | 303/11 |
| 7,322,800 | B2* | 1/2008 | Roth | F01M 1/02 |
| | | | | 123/196 R |
| 7,795,752 | B2 | 9/2010 | Gorman et al. | |
| 7,908,852 | B2* | 3/2011 | Zhang | E02F 9/2217 |
| | | | | 60/414 |
| 8,387,386 | B2* | 3/2013 | Schmeltz | F02G 5/02 |
| | | | | 60/614 |
| 2002/0125052 | A1* | 9/2002 | Naruse | B60K 6/12 |
| | | | | 180/53.8 |
| 2007/0227802 | A1 | 10/2007 | O'Brien | |
| 2009/0165451 | A1* | 7/2009 | Mueller | B60K 6/12 |
| | | | | 60/478 |
| 2009/0241534 | A1 | 10/2009 | Tikkanen et al. | |
| 2013/0206533 | A1* | 8/2013 | Mepham | F16D 25/123 |
| | | | | 192/48.601 |
| 2014/0034139 | A1* | 2/2014 | Pierik | F01L 9/02 |
| | | | | 137/2 |
| 2014/0379241 | A1* | 12/2014 | Otanez | F02N 11/0833 |
| | | | | 701/104 |
| 2015/0027109 | A1* | 1/2015 | Cottingham | E02F 9/2217 |
| | | | | 60/414 |

FOREIGN PATENT DOCUMENTS

| | | |
|---|---|---|
| JP | H05287774 (A) | 11/1993 |
| JP | 2008045309 | 2/2008 |
| JP | 2011505292 | 2/2011 |
| WO | WO 2009/073128 | 6/2009 |

\* cited by examiner

Increasing the boost pressure in preparation for a load burst

HYDRAULIC HYBRID

Machines with a hydrostatic drive consist of an internal combustion engine, several hydraulic pumps, hydraulic lines, hydraulic valves, control elements, motors and hydraulic cylinders.

BACKGROUND

Such systems are disclosed, for example, in German patent DE 1020 09 824 B4. The excess energy is stored in an electric battery.

A disadvantage of this is that additional batteries and additional electric motors are needed in order to utilize the excess energy, and also that these systems only take into account the hydraulic side.

SUMMARY OF THE INVENTION

It is an object of the present invention is to avoid the above-mentioned drawbacks and to create a hybrid system that can efficiently handle the accumulated stored energy on hand, particularly with an eye towards optimizing the operating point of the engine, while paying special attention to the aspects of fuel consumption, dynamic behavior of the engine, noise level as well as wear and tear.

In order to optimize these machines, the excess energy or the engine output is stored in hydraulic accumulators during the low-load phases of the internal combustion engine so that it can be released or used to increase the available system output during phases of a high or excessive output demand.

In this context, the optimization is achieved in that, for a brief time, more output is available in the system than the internal combustion engine can deliver at its momentary operating point. For this reason, the system is more powerful and the behavior is more dynamic during load changes. At the same time, the braking performance of the system or of the engine can be improved by recovering braking energy, and a drag torque on the engine can be avoided or reduced. As a result, the maximum rotational speeds that occur in the engine can be markedly reduced. Then, during low-load phases, the free engine output is available to charge the accumulator.

According to the invention, on the one hand, a system is provided for detecting the state or the state values of the engine, of the hydraulic system and of the devices, and, on the other hand, a partial system is provided for engine-performance optimization and braking-effect optimization by means of the hydraulic energy-storage unit, for example, pressure accumulators in the form of bubble accumulators or diaphragm accumulators or piston-type accumulators.

The system consists of an internal combustion engine with added-on or integrated hydraulic pumps for the work and/or drive circuit, an engine control unit for electronic engine regulation and fuel-injection regulation, a hydraulic control unit to control the hydraulic consumers, hydraulic control modules, actuators and valves, a pressure sustaining valve, at least one reversing valve and at least one hydraulic pressure accumulator.

The engine control unit detects engine-specific measured values. These include the coolant temperature, the charge-air pressure, the load torque, the fuel-injection quantity, the rotational speed, the rail pressure, the fuel feed pressure and the target speed value. On the basis of these measured values, the control variables for engine regulation are entered into the control unit in the form of parameters, performance curves and characteristics. The appertaining operating point of the engine is thus ascertained and set.

DETAILED DESCRIPTION OF THE DRAWINGS

Figure 1:
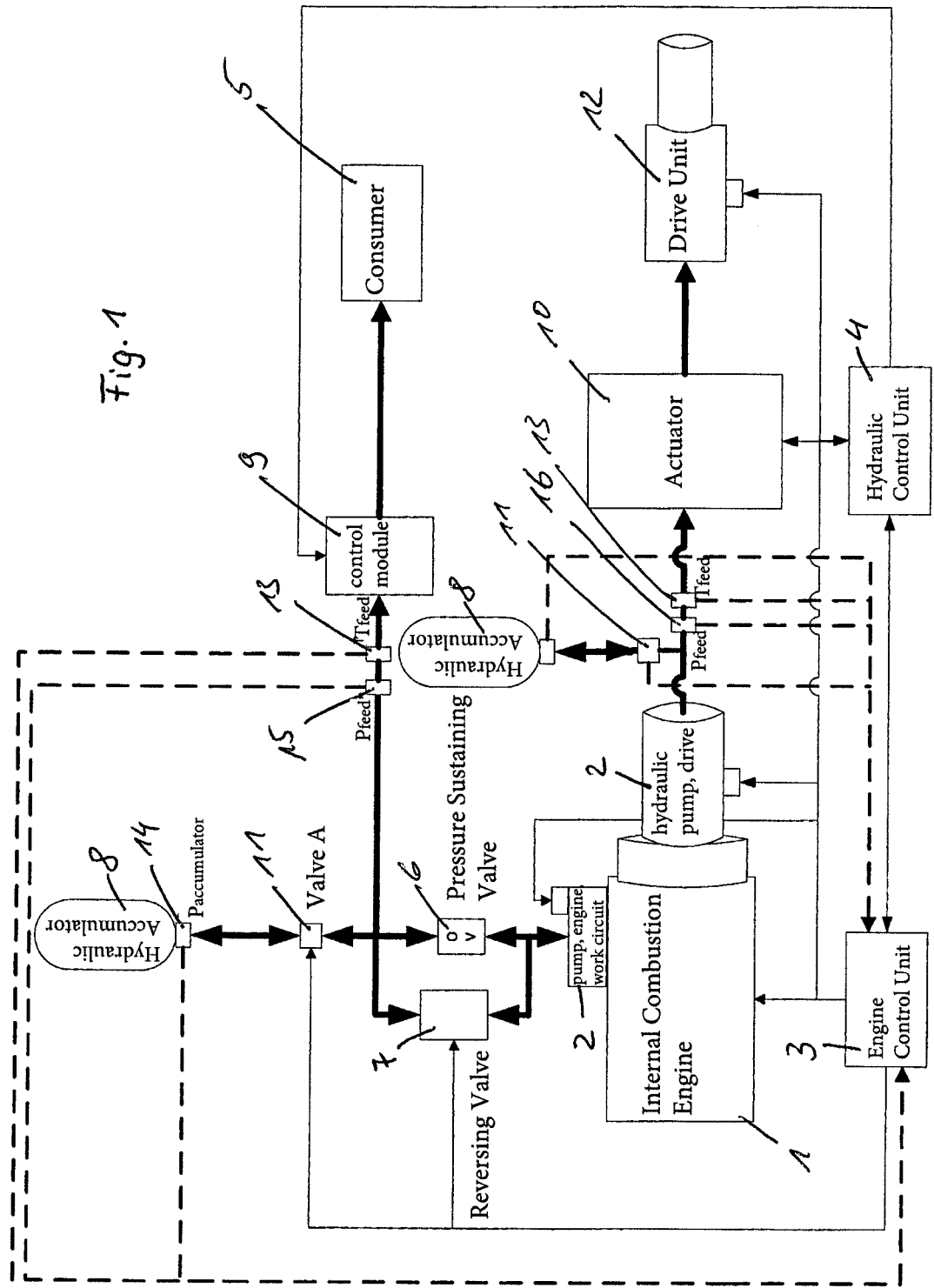
FIG. 1 shows a system in which additional measured values are available to an engine control unit.

In the system shown here in FIG. 1, additional measured values such as the hydraulic pressure in the hydraulic accumulator, the hydraulic pressure and the temperature of the work circuit, the hydraulic pressure and temperature of the drive as well as the pivoting angle of the work pump and of the drive pump are all available to the engine control unit. Information about the state, for instance, the operating point, of the appertaining hydraulic components, and about the load demanded by the components is sent from the hydraulic control unit to the engine control unit.

The hybrid system includes an internal combustion engine 1 with added-on and/or integrated hydraulic pumps 2 to supply consumers 5 and/or a drive unit 12, at least one engine control unit 3 for electronic engine regulation and/or fuel-injection regulation, at least one hydraulic control unit 4 to control at least one hydraulic consumer 5, at least one pressure sustaining valve 6, at least one reversing valve 7 and at least one hydraulic pressure accumulator 8. The hydraulic consumer 5 can be controlled by the control module 9. The drive unit 12 is configured to allow communication by means of the actuator 10. The actuator 10 is configured to allow communication by means of the hydraulic control unit 4. The hydraulic accumulator 8 has at least one pressure sensor 14. A pressure sensor 15 is arranged between the control module 9 and the reversing valve 7. A pressure sensor 16 is arranged between the actuator 10 and the hydraulic pump 2. A temperature sensor 13, the pressure sensor 14, the pressure sensor 15 and the pressure sensor 16 are arranged so as to communicate with the engine control unit 3.

In the engine control unit, the charging and discharging processes of the pressure accumulator are regulated on an as-needed basis as a function of the above-mentioned data.

The accumulator is charged (loading, FIG. 2) by opening valve A in the work circuit and/or by opening valve B (valve 11) in the drive circuit. This is controlled as a function of the ratio of the hydraulic pressures $P_{feed}$ to $P_{accumulator}$, of the torques $M_{available}$ to $M_{actual}$ and as a function of the engine temperature $T_K$ and the hydraulic temperature $T_{feed}$, as is shown in FIG. 2.

Once the prescribed conditions have been met, the engine control unit checks on the basis of additional characteristic values whether charging (FIG. 2) is advantageous.

Braking-Energy Recovery

Figure 2:
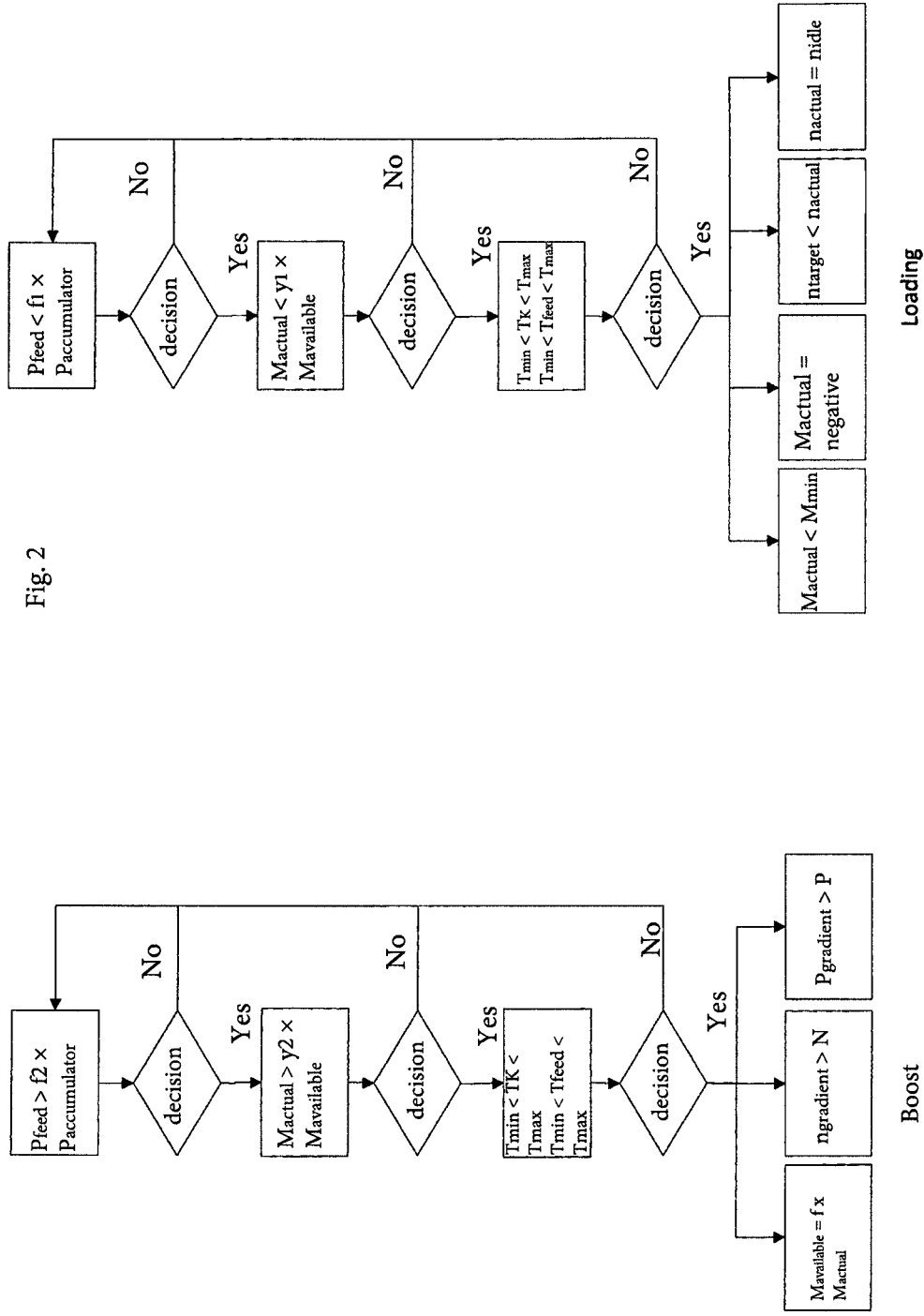
FIG. 2 shows a loading process of an accumulator.

If the engine is subject to drag torque, that is to say, if $M_{actual}$ is negative, then the complete output of the engine plus the braking output are available for the loading (FIG. 2).

Valve A and/or valve B are opened until the accumulator has been charged or else until one of the prerequisites is no longer being met.

If the engine speed is higher than the target speed, that is to say, $n_{target} < n_{actual}$, then all of the available output ($M_{available} - M_{actual}$) is available for the loading (FIG. 2). Valve A and/or valve B are opened until the accumulator has been charged or else until one of the prerequisites is no longer being met.

If the engine is idling and the coolant temperature is above a minimum temperature $n_{actual} = n_{idle}$ and $T_K > M_{available} T_{min}$, then all of the available output ($M_{available} - M_{actual}$) is available for the charging (FIG. 2). Valve A and/or valve B are opened until the accumulator has been charged or else until one of the prerequisites is no longer being met.

Loading (FIG. 2) takes place when the engine is in a low-load phase and the available torque is considerably greater than $M_{actual}$.

In addition, the loading (FIG. 2) can be activated or deactivated by the engine control unit when the engine is at an unfavorable operating point, for example, in terms of the fuel consumption efficiency, the emission behavior, the boost pressure, the noise level as well as the measured values and information of the hydraulic control unit, and a more suitable operating point can be achieved by switching the function over.

As an alternative, the loading (FIG. 2) can also be regulated steplessly by means of a control valve in order to implement a gentler switching on and off of the engine load.

Figure 3:
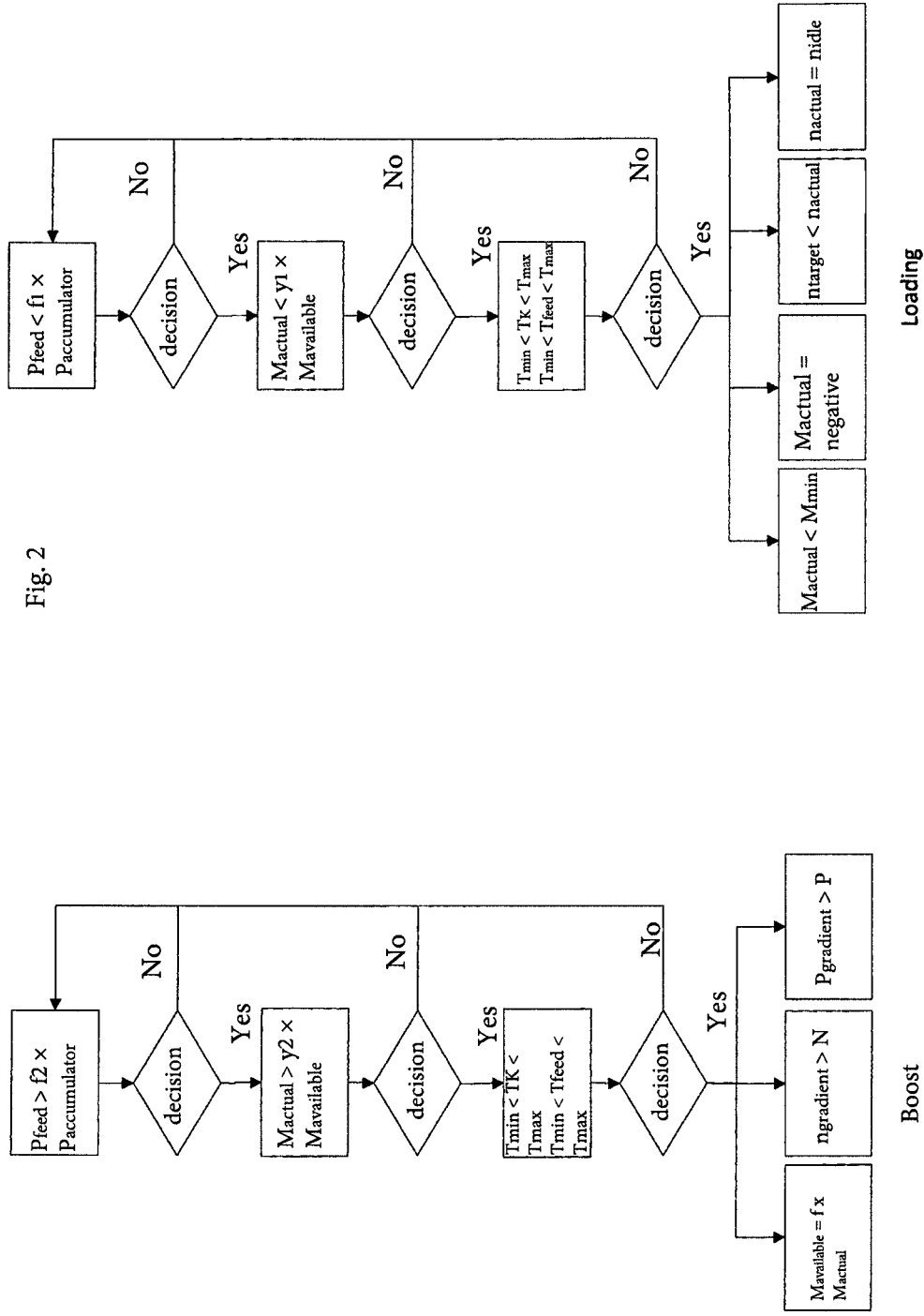
FIG. 3 shows a discharging (boost) process of an accumulator.

The discharging (boost, FIG. 3) of the accumulator is initiated by opening valve A in the work circuit and/or valve B in the drive circuit. This is controlled as a function of the ratio of the hydraulic pressures $P_{feed}$ to $P_{accumulator}$, of the torques $M_{available}$ to $M_{actual}$, and as a function of the engine temperature $T_K$ and the hydraulic temperature $T_{feed}$.

Once the prescribed conditions have been met, the engine control unit checks on the basis of additional characteristic values whether boosting (FIG. 3) is advantageous.

If the engine in the momentary operating point cannot produce any additional output, that is to say, $M_{available} = f \cdot M_{actual}$ (f=safety factor, e.g. 0.9), then valve A and/or valve B are opened until the accumulator is discharged or else until one of the prerequisites is no longer being met.

If the engine is at the smoke limit or another output limit, that is to say, $M_{available} = f \cdot M_{actual}$ (f=safety factor, e.g. 0.9), then valve A and/or valve B are opened until the accumulator is discharged or else until one of the prerequisites is no longer being met.

If the engine (1) is rapidly accelerated, that is to say, $n_{gradient} > N$ (rotational speed gradient as the adjustable factor), then valve A and/or valve B are opened until the accumulator has been discharged or else until one of the prerequisites is no longer being met.

In case of a pronounced pressure drop of the feed pressure when the load is rapidly introduced into the hydraulic work circuit, that is to say, $P_{gradient} > P$ (feed pressure gradient as the adjustable factor), then valve A and/or valve B are opened until the accumulator has been discharged or else until one of the prerequisites is no longer being met.

In addition, boosting (FIG. 3) can also be activated or deactivated by the engine control unit when the engine is at an unfavorable operating point (for example, in terms of the following parameters, namely, the fuel-consumption efficiency, the emission behavior, the boost pressure level, the noise level, the measured values and information of the hydraulic control unit), and a more suitable operating point can be achieved by switching the function over.

Figure 4:
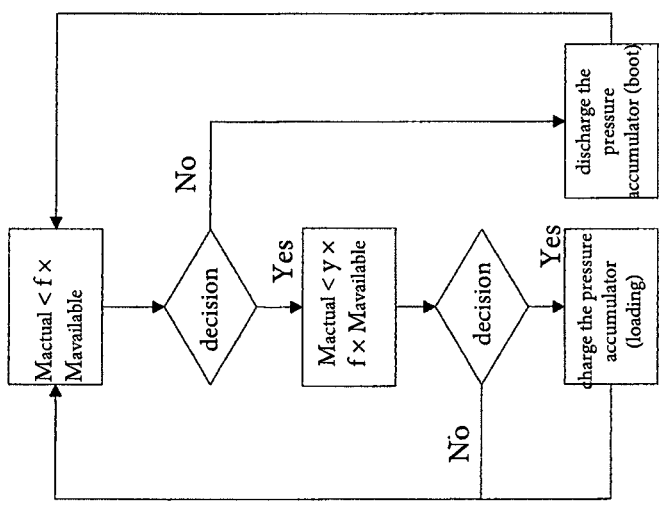
FIG. 4 shows an example of a reduction of an operating rotational speed in order to optimize fuel consumption.

The reduction of the operating rotational speed in order to optimize the fuel consumption is shown, for example, in FIG. 4.

High dynamic requirements call for engine speeds within the range from about 1800 to 2300 rpm, close to the maximum capacity of the engine, in order to have sufficient torque reserves available during the reductions in the rotational speed that inevitably occur, and the result is a rise in the torque curve in case of dropping rotational speeds in this speed range. Moreover, there is a need for complex limit-load regulation in order to prevent the internal combustion engine from stalling.

If the operating speed is reduced so that it falls within the range of the rated torque of the engine, namely, about 1400 to 1600 rpm, then the dynamic load peaks that suddenly occur can be ideally compensated for by boosting (FIG. 4).

The reduction of the operating speed for purposes of noise reduction is shown in FIG. 4.

High dynamic requirements call for engine speeds within the range from about 1800 to 2300 rpm, close to the maximum output of the engine, in order to have sufficient torque reserves available during the reductions in the rotational speed that inevitably occur, and the result is a rise in the torque curve in case of dropping rotational speeds in this speed range. Moreover, there is a need for complex limit-load regulation in order to prevent the internal combustion engine from stalling.

If the operating speed is reduced so that it falls within the range of the rated torque of the engine, namely, about 1400 to 1600 rpm, then the dynamic load peaks that suddenly occur can be compensated for by boosting (FIG. 4).

Figure 6:
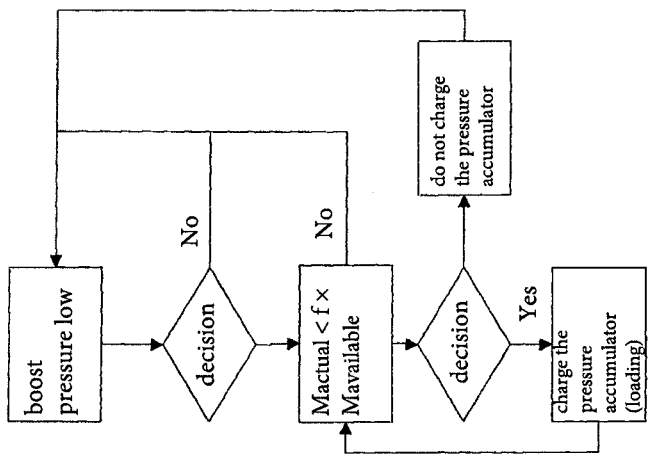
FIG. 6 shows increasing a boost pressure in preparation for a load burst.

The increase in the boost pressure is shown in FIG. 6. For purposes of improving the dynamic behavior of the engine, the loading function (FIG. 6) can be activated during phases with a very low torque level in order to increase the delivered torque and thus the boost pressure. This is typically done shortly before a high torque is demanded by the hydraulic system. Thanks to the associated increase in the boost pressure, the turbocharger responds considerably better when the hydraulic load is introduced.

Figure 5:
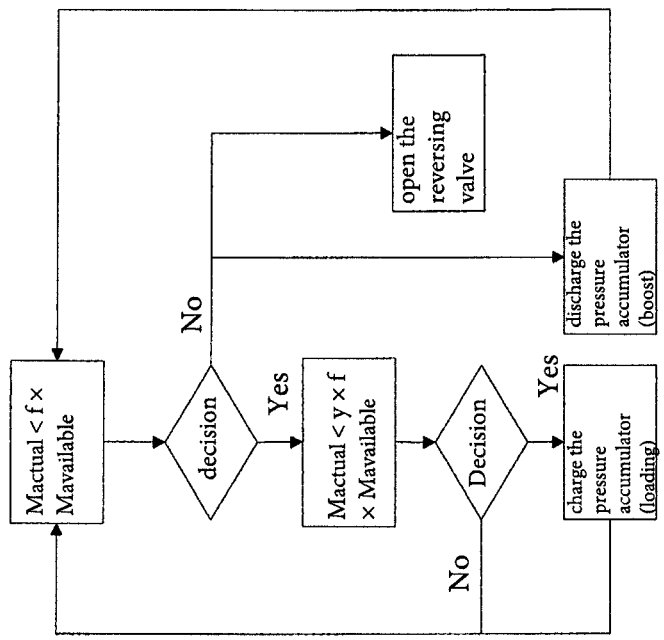
FIG. 5 shows a boost function to relieve an engine and to compensate for load peaks in the entire system.

In order to relieve the engine, the boost function (FIG. 1, FIG. 5) can be activated and, at the same time, the reversing valve 7 can be opened. Then the hydraulic pump 2 functions as a motor and the dynamic behavior of the entire system can be markedly improved in that it introduces the stored energy from the hydraulic accumulator 8 into the internal combustion engine 1 via the crankshaft of the internal combustion engine 1 or via its gear rim on the flywheel.

In an alternative embodiment, the boosting can also be regulated steplessly by means of a control valve in order to implement a gentler switching on and off of the engine load.

Starter assistance (starting) can likewise be provided by the hydraulic pump 2 via the energy stored in the hydraulic accumulator 8.

The accumulator is discharged by opening valve A in the work circuit and/or valve B in the drive circuit.

This is controlled as a function of the ratio of the hydraulic pressures $P_{feed}$ to $P_{accumulator}$, of the torques $M_{available}$ to $M_{actual}$, and as a function of the engine temperature $T_K$ and the hydraulic temperature $T_{feed}$.

If the engine speed is zero, valve A and/or valve B as well as the reversing valve are actuated and the hydraulic pump is used as a starter motor for the internal combustion engine.

In the case of applications involving a high base load, the energy from the accumulator (8) can be fed in the same manner in order to assist the starter when the internal combustion engine is racing, provided that the speed of the internal combustion engine is lower than the idle speed ($n_{actual} < n_{idle}$).

The start assistance can perform an automatic start-stop function.

After the engine has been idling for a parameterizable time t, it is stopped automatically. If the engine speed is zero and the driver or operator of the machine pushes down on the gas pedal, valve A and/or valve B as well as the reversing valve 7 are automatically activated and the hydraulic pump is used as the starter motor for the internal combustion engine 1. This translates into considerable savings in terms of fuel consumption. Moreover, the engine 1 is started without placing a burden on the electric starter of the engine. As a rule, the number of charging/discharging cycles of the hydraulic accumulator over the service life is generally higher than the number of possible start-ups using the electric starter.

Bringing the Engine to its Operating Temperature More Quickly

In the case of cold ambient temperatures and at a very low engine load, the internal combustion engine only warms up very slowly until it has reached its actual operating temperature. The wear and tear of the engine is high and the fuel consumption is not optimal during this cold phase. Dynamic loads that more quickly bring the engine to its operating temperature can be generated by charging/discharging the hydraulic accumulator several times.

The use of the above-mentioned functionalities makes it possible to advantageously enhance the performance of the machine, the fuel consumption as well as the wear and tear of the engine are reduced, and the engine utilization is optimized. The temporary additional output permits downsizing, which means that an engine with less displacement can be employed, which is more favorable from an energy-related standpoint.

The application principle can be used in all systems that have an internal combustion engine or a gas engine in conjunction with hydraulic consumers and hydrostatic drives.

Abbreviations $P_{feed}$ pressure in the hydraulic feed circuit
$P_{accumulator}$ pressure in the hydraulic accumulator
$T_{feed}$ temperature in the hydraulic feed circuit
$T_{max}$ maximum permissible temperature in the hydraulic accumulator
$T_{min}$ minimum permissible temperature in the hydraulic accumulator
$n_{actual}$ momentary speed of the internal combustion engine
$n_{target}$ momentary target speed of the internal combustion engine
$n_{idle}$ idle speed of the internal combustion engine
$M_{available}$ momentary available maximum torque of the internal combustion engine
$M_{actual}$ momentary delivered torque of the internal combustion engine
$T_K$ coolant temperature of the internal combustion engine
$T_{max}$ maximum permissible coolant temperature to function
$T_{min}$ minimum permissible coolant temperature to function
$n_{gradient}$ rotational speed gradient
$P_{gradient}$ feed pressure gradient

LIST OF REFERENCE NUMERALS

1 internal combustion engine
2 hydraulic pump
3 consumer
4 hydraulic control unit
5 consumer
6 pressure sustaining valve
7 reversing valve
8 pressure accumulator
9 control module
10 actuator
11 valve
12 drive unit
13 temperature sensor
14 pressure sensor
15 pressure sensor
16 pressure sensor

What is claimed is:

1. A hybrid system comprising:
   at least one hydraulic consumer;
   an internal combustion engine with hydraulic pumps, the hydraulic pumps being added-on and/or integrated hydraulic pumps to supply the at least one consumer and/or a drive unit;
   at least one engine control unit for electronic engine regulation and/or fuel-injection regulation;
   at least one reversing valve configured for controlling fluid flow from at least one of the hydraulic pumps to the at least one hydraulic consumer;
   at least one hydraulic pressure accumulator in fluid communication with at least one of the hydraulic pumps;
   at least one pressure sustaining valve configured for controlling fluid flow between at least one of the hydraulic pumps and the at least one hydraulic pressure accumulator; and
   at least one hydraulic controller configured to control the at least one hydraulic consumer, the at least one pressure sustaining valve, the at least one reversing valve and the at least one hydraulic pressure accumulator, the control including charging or discharging the at least one hydraulic pressure accumulator as a function of a ratio of a hydraulic pressure $P_{feed}$ a feed line from at least one of the hydraulic pumps to a hydraulic pressure $P_{accumulator}$ of the at least one hydraulic pressure accumulator, as a function of a ratio of an available torque $M_{available}$ of M the engine to actual torque the engine and as a function of an engine temperature $T_K$ and a hydraulic temperature $T_{feed}$.

2. The hybrid system as recited in claim 1 further comprising a pressure sensor coupled to the reversing valve.

3. The hybrid system as recited in claim 1 wherein the drive unit is configured to allow communication by an actuator.

4. The hybrid system as recited in claim 3 wherein the actuator is configured to allow communication by the hydraulic controller.

5. The hybrid system as recited in claim 3 wherein a pressure sensor is arranged between the actuator and at least one of the hydraulic pumps.

6. The hybrid system as recited in claim 1 wherein the hydraulic pressure accumulator has at least one first pressure sensor.

7. The hybrid system as recited in claim 6 further comprising a temperature sensor, a second pressure sensor is arranged between the actuator and at least one of the hydraulic pump and a third pressure sensor, the temperature sensor, the first pressure sensor, the second pressure sensor and the third pressure sensor being arranged so as to communicate with the engine control unit.

8. A method for operating a hybrid system comprising:
providing at least one hydraulic consumer and an internal combustion engine with hydraulic pumps, the hydraulic pumps being added-on and/or integrated hydraulic pumps;
providing:
- at least one reversing valve configured for controlling fluid flow from at least one of the hydraulic pumps to the at least one hydraulic consumer,
- at least one hydraulic pressure accumulator in fluid communication with at least one of the hydraulic pumps, and
- at least one pressure sustaining valve configured for controlling fluid flow between at least one of the hydraulic pumps and the at least one hydraulic pressure accumulator supplying, by at least one of the hydraulic pumps, the at least one hydraulic consumer and/or a drive unit;
regulating, by at least one engine control unit, an electronic engine and/or a fuel-injection of the internal combustion engine; and
controlling the at least one hydraulic consumer, the at least one pressure sustaining valve, the at least one reversing valve and the at least one hydraulic pressure accumulator, the controlling including discharging the at least one hydraulic pressure accumulator as a function of a ratio of a hydraulic pressure $P_{feed}$ a feed line from at least one of the hydraulic pumps to a hydraulic pressure $P_{accumulator}$ of the at least one hydraulic pressure accumulator, as a function of a ratio of an available torque $M_{available}$ of the engine to actual torque $M_{actual}$ of the engine and as a function of an engine temperature $T_K$ and a hydraulic temperature $T_{feed}$.

9. The method as recited in claim 8 further comprising:
continuously monitoring an engine and a machine state, the monitoring being performed by at least one first pressure sensor of the hydraulic pressure accumulator, a temperature sensor, a second pressure sensor arranged between the actuator and at least one of the hydraulic pumps and a third pressure sensor; and
controlling charging and discharging of the hydraulic accumulator in order to optimize the engine/machine dynamics and/or the load behavior.

10. The method as recited in claim 8 further comprising:
continuously monitoring an engine and a machine state, the monitoring being performed by at least one first pressure sensor of the hydraulic pressure accumulator, a temperature sensor, a second pressure sensor arranged between the actuator and at least one of the hydraulic pumps and a third pressure sensor; and
controlling charging and discharging of the hydraulic accumulator in order to optimize the engine/machine dynamics and/or the load behavior, while taking into account the emission behavior of the engine.

11. The method as recited in claim 8 wherein the controlling includes, when the engine is in a momentary operating point in which an available torque $M_{available}$ of the engine is equal to actual torque $M_{actual}$ of the engine multiplied by a safety factor f, discharging the at least one hydraulic pressure accumulator.

12. A method for operating a hybrid system comprising:
providing at least one hydraulic consumer and an internal combustion engine with hydraulic pumps, the hydraulic pumps being added-on and/or integrated hydraulic pumps;
providing:
- at least one reversing valve configured for controlling fluid flow from at least one of the hydraulic pumps to the at least one hydraulic consumer,
- at least one hydraulic pressure accumulator in fluid communication with at least one of the hydraulic pumps, and
- at least one pressure sustaining valve configured for controlling fluid flow between at least one of the hydraulic pumps and the at least one hydraulic pressure accumulator supplying, by at least one of the hydraulic pumps, the at least one hydraulic consumer and/or a drive unit;
regulating, by at least one engine control unit, an electronic engine and/or a fuel-injection of the internal combustion engine; and
controlling the at least one hydraulic consumer, the at least one pressure sustaining valve, the at least one reversing valve and the at least one hydraulic pressure accumulator, the controlling including charging the at least one hydraulic pressure accumulator as a function of a ratio of a hydraulic pressure $P_{feed}$ a feed line from at least one of the hydraulic pumps to a hydraulic pressure $P_{accumulator}$ of the at least one hydraulic pressure accumulator, as a function of a ratio of an available torque $M_{available}$ of the engine to actual torque $M_{actual}$ of the engine and as a function of an engine temperature $T_K$ and a hydraulic temperature $T_{feed}$.

13. The method as recited in claim 12 wherein the controlling includes, when the actual torque $M_{actual}$ of the engine is negative, making available a complete output of the engine plus a braking output for charging the at least one hydraulic pressure accumulator.

14. The method as recited in claim 12 wherein the controlling includes, when the available torque $M_{available}$ of the engine is greater than the actual torque $M_{actual}$ of the engine, making available a difference between the available torque $M_{available}$ of the engine and the actual torque $M_{actual}$ of the engine for charging the at least one hydraulic pressure accumulator.

* * * * *